Patented June 15, 1937

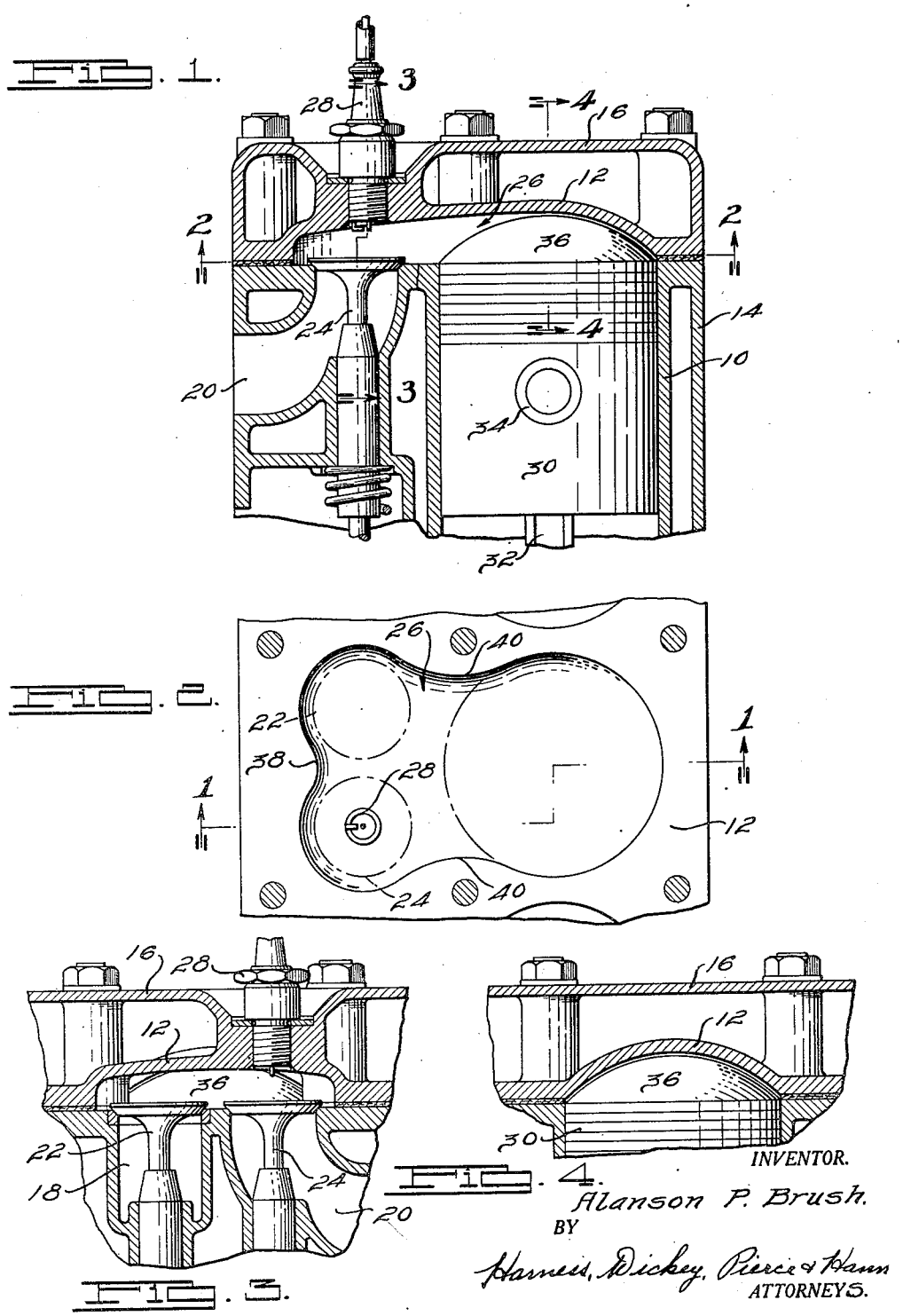

2,083,939

UNITED STATES PATENT OFFICE 2,083,939

INTERNAL COMBUSTION ENGINE

Alanson P. Brush, Detroit, Mich.

Application January 2, 1935, Serial No. 43

2 Claims. (Cl. 123—191)

This invention relates to internal combustion engines operating on the Otto cycle and particularly those of the modern high compression L-head type, the principal object being the provision of a combustion chamber designed for such engines by means of which a greater volumetric efficiency, as compared to conventional constructions, may be obtained, thereby enabling a greater speed and power output to be obtained in an engine of the same bore and stroke.

Objects of the invention include the provision of an internal combustion engine of the L-head type having a compression ratio in excess of five to one and in which the combustion chamber of the engine and the cooperating piston are so constructed and arranged as to obtain an unusually free and unrestricted flow of gas around the valves and between the combustion chamber and the engine cylinder; the provision of a high compression L-head type of internal combustion engine in which the combustion chamber may be of maximum depth over the center of the piston so as to permit a copious flow of gas between the valves and the cylinder and yet permit the effective volume of the combustion chamber, when the piston is in its top dead center position, to be so reduced as to permit the use of unusually high compression ratios; the provision of an internal combustion engine of the high compression L-head type in which the combustion chamber extends over the cylinder at a material depth and in which the piston is so constructed and arranged as to cooperate with the combustion chamber to effectively reduce the effective volume of the combustion chamber when the piston is in its upper dead center position and in which the piston in moving downwardly from such position acts to increase the area provided for the flow of gases between the combustion chamber and the cylinder; the provision of an L-head type of internal combustion engine having a domed piston and a combustion chamber so formed and arranged as to receive the domed head of the piston therein when the piston is at its upper dead center position; and the provision of an internal combustion engine of the L-head type having a piston provided with a domed head and a combustion chamber shaped to provide a minimum amount of clearance over substantially half the area of the domed head of the piston on the side of the piston opposite the valve, the combustion chamber being so formed and shaped between that portion in which the valves work and that portion in which the piston is adapted to be received as to permit an extremely copious flow of gas between such portions.

The above being among the objects of the present invention, the same consists of certain novel features of construction and combinations of parts to be hereinafter described with reference to the accompanying drawing, and then claimed, having the above and other objects in view.

In the accompanying drawing which illustrates a suitable embodiment of the present invention and in which like numerals refer to like parts throughout the several different views, Fig. 1 is a fragmentary, partially broken, vertical sectional view taken axially through the cylinder and one of the valves of an L-head type of internal combustion engine, as on the line 1—1 of Fig. 2, the piston, valve and valve guide being shown in full side elevation.

Fig. 2 is a fragmentary view of the cylinder head of the engine shown in Fig. 1 taken as on the line 2—2 of Fig. 1, disclosing the combustion chamber therein.

Fig. 3 is a fragmentary, vertical sectional view taken on the line 3—3 of Fig. 1.

Fig. 4 is a fragmentary, vertical sectional view taken on the line 4—4 of Fig. 1.

In internal combustion engines of the type employed in automobiles it is necessary, in order to obtain performance in accordance with present day requirements, to employ a relatively high compression ratio. Compression ratios at the present time for these internal combustion engines which operate on the Otto cycle range from five to one, to six and one-half or more to one in the automotive field. Because of the advantage to be gained by increasing the compression ratio as regards sped, power output and economy of operation, means are constantly being sought to permit the employment of still higher compression ratios in a satisfactorily workable manner.

In order to permit reduction of the combustion chamber volume to obtain these high compression ratios in modern internal combustion engines of the L-head type it has heretofore been customary to form the combustion chamber as a pocket in the cylinder head, located to a great proportion of its extent over the valves and offset from the cooperating cylinder, and overlapping the bore of the cylinder only to an extent sufficient to permit the required flow of gases between the cylinder and the combustion chamber. That portion of the cylinder head over the cylinder and not including the combustion chamber is formed flat and the conventional flat top piston is so constructed and arranged as to permit it to approach this portion of the cylinder head at its upper dead center position as close as possible, with due consideration for necessary clearance for practical reasons well known to those skilled in the art. This together with the ever present tendency towards increased valve sizes to permit a freer flow of gas between the combustion chamber and the intake and exhaust manifolds of the engine has resulted in such a restriction of the area of communication between the combustion chamber and the cylinder and between that portion of the combustion chamber over the valves and that portion over the cylinder, as to materially restrict the flow of gas between the valves and the cylinder at higher engine speeds, and this results in relatively poor volumetric efficiency of the engine at such speeds. Obviously this relatively poor volumetric efficiency of these engines at higher speeds materially reduces both the power output and the speed of the engine over that which might otherwise be possible if such restriction was eliminated.

The present invention is designed to permit internal combustion engines of the L-head type to employ a maximum useable compression ratio and yet to permit a more copious flow of gas for any given combustion chamber volume around the valves and between the combustion chamber and the cylinder of the engine, as compared to conventional constructions, thereby resulting in greater speed and power than would otherwise be possible in an engine having a conventional type and design of combustion chamber.

Referring now to the drawing, a fragment of an engine of the L-head type is shown as including a cylinder 10 having a cylinder head 12 which are provided with the usual water jackets 14 and 16 respectively. The cylinder casting is formed to provide an inlet passage 18 (see Fig. 3) and an exhaust passage 20, which passages at their point of connection with the combustion chamber are controlled by suitable inlet and exhaust valves 22 and 24 respectively in accordance with conventional practice, and which valves may be operated in accordance with conventional practice by a cam shaft, not shown. The cylinder head 12 is formed to provide a combustion chamber indicated generally at 26 over each cylinder 10 and its cooperating pair of valves 22 and 24. While the spark plug 28 may be placed in any desired or convenient position, it is shown in the drawing as being located over the exhaust valve 24 as this has been found to be a desirable location for the same. The piston 30 which is slidably received in the cylinder 10 for reciprocation therein is connected to a crankshaft (not shown) by means of a connecting rod 32 and piston pin 34 in accordance with conventional practice, and it may be formed in any suitable or desirable manner excepting that instead of being provided with a flat head in accordance with conventional practice in L-head engines, it is formed with a domed head 36. The particular shape or configuration of the head 36 is more or less immaterial as long as it is of generally domed shape and sufficiently domed to obtain the benefits hereinafter described, but it will be found more convenient and economical both in the manufacture of the piston and the cylinder head if the domed head 36 is formed as part of the surface of a sphere, and accordingly it is shown of such shape in the drawing.

As best illustrated in the plan view of the combustion chamber 26 in Fig. 2, the left-hand end of the combustion chamber, as viewed in Figs. 1 and 2, extends over the valves 22 and 24 and is preferably shaped into concentric relation with respect thereto over a portion of their perimeters, and where necessary or desirable in order to obtain the required compression ratio, may be scalloped as at 38 between the valves along its left-hand margin. As indicated best in Figs. 1 and 4, the right-hand end of the combustion chamber 26, as viewed in Figs. 1 and 2, is formed to conform in shape with the right-hand half of the domed head 36 and so that the domed head 36 will relatively closely approach the walls of the combustion chamber over this portion of the piston head when the piston is in its upper dead center position. Preferably only sufficient clearance is allowed over this area when the piston is in its upper dead center position as to prevent, for instance, the piston from striking the walls of the combustion chamber should the bearing of the corresponding connecting rod 32 burn out in service, or for other practical reasons. As will be particularly shown in Fig. 2, the right-hand end of the combustion chamber 26 in plan view conforms in shape to the upper right-hand end of the bore of the cylinder 10 and although the shape of the side walls of the combustion chamber 26 extending between the right and left-hand ends of the combustion chamber, as viewed in Figs. 1 and 2, may be varied to best suit the desires or fancies of the particular designer, they are shown as dipping inwardly as at 40, not only to aid in reducing the effective volume of the combustion chamber but also in order to obtain a more nearly constant cross sectional area of the combustion chamber between the cylinder and the valve as will hereinafter be more fully explained.

The vertical dimensions of the combustion chamber 26 over the valves 22 and 24 is preferably no greater than that required to permit the proper lift of the valve and desired free flow of gas past the valves on the suction and exhaust strokes respectively of the piston 30. The amount which the head 36 of the piston 30 is domed, or in other words, the axial dimension of the domed head 36, may vary to a greater or lesser extent but ordinarily it will be found preferable, particularly where the width of the combustion chamber 26 across the axis of the valves 22 and 24 exceeds the bore of the cylinder 10, that it be of greater height than the height of the combustion chamber over the valves 22 and 24, as indicated in the drawing. Preferably, the height of the combustion chamber between the axis of the piston 30 and a plane passing through the axes of the valves 22 and 24 should be such that the area thereof measured in any plane parallel to a plane including the axes of the valves 22 and 24, from the axes of the valve to the axis of the cylinder 10 or to a plane approaching such axis, will be substantially equal in all cases, thus providing a construction in which there is no area of restriction between the valves and the cylinder. In such case it will be recognized that the shape of the combustion chamber 26 may be so controlled as to obtain a maximum transverse area throughout that portion of the length thereof through which the gases flowing between the valve ports and the cylinder must travel, this obviously being an ideal condition permitting the most copious flow of gases through the combustion chamber.

It will be observed that the piston 30 when in its upper dead center position projects the domed head 36 thereof into the combustion chamber 26 and thereby decreases the effective volume of the combustion chamber by the volume of the head 36, and in this manner the combustion chamber 26 may be so constructed and arranged as to provide the necessary small effective volume for obtaining the desired high degree of compression ratio and yet so as to permit a maximum transverse area of the combustion chamber for the flow of gases between the cylinder and the valves. Additionally, it will be noted that when the piston 30 is moving downwardly from its upper dead center position shown, as it moves downwardly it acts to increase the area of communication between the combustion chamber and the cylinder to a maximum amount corresponding with the cross sectional area of the cylinder, this feature being of great advantage as compared to conventional construction where the area of communication between the combustion chamber and the cylinder remains constant regardless of the position of the piston in the cylinder. Likewise as the piston 30 approaches its upper dead center position on the exhaust or compression strokes, the area of communication between the cylinder and the combustion chamber remains at a maximum figure until the piston closely approaches its upper dead center position and then only gradually reduces such area. By this means the most copious flow of gases for any given combustion chamber value, volume around the valves and between the combustion chamber into the cylinder is obtained, with the result that an engine having a combustion chamber and piston designed in accordance herewith will be found to have a volumetric efficiency at high engine speed greatly in excess of an equivalent engine having a combustion chamber of conventional form and design. The result is that an engine equipped with the present invention will be capable of delivering more power, and rotating at higher speeds than an equivalent engine provided with a combustion and piston construction of the conventional type.

Another feature of the construction provided by the present invention will be noted to be the smoothness of the flow of gases between the valves and the cylinder and the freedom from violent changes in the direction of flow. This is of advantage due to the fact that any violent change in the direction of flow of the gases necessarily requires an obstruction or restriction to cause it, and elimination of such obstruction or restriction enhances the ease of flow and thus is an aid toward better volumetric efficiency.

Formal changes may be made in the specific embodiment of the invention described without departing from the spirit or substance of the broad invention, the scope of which is commensurate with the appended claims.

I claim:

1. In an internal combustion engine of the L-head type in combination, a flat topped cylinder block having a cylinder formed therein and adjacent inlet and outlet ports formed therein at one side only of said cylinder and opening onto said flat top, a valve for each of said ports seating against said flat top for controlling the flow of gases through said ports, a cylinder head overlying said flat top, a piston reciprocable in said cylinder, a symmetrical substantially spherical domed head on said piston, and a combustion chamber formed in said cylinder head and overlying said cylinder and valves, that portion of said combustion chamber on the opposite side of the cylinder axis from said valves being shaped complementary to the corresponding half of said domed head, the construction being such that a part of the dome substantially fills the last named portion of the combustion chamber, having mechanical clearance only therebetween when said piston is at the outer end of said stroke, the height of said combustion chamber, measured in a direction parallel to the axis of said cylinder, being a minimum over said valves and being a maximum between said valves and the axis of said cylinder with the piston on dead center, said combustion chamber being so constructed and arranged that the cross-sectional area thereof measured in a direction normal to the general direction of flow between said valves and said cylinder is approximately constant over the distance between said valves and cylinder, and an ignition point serving said combustion chamber located at the valve end thereof.

2. In an internal combustion engine of the L-head type, in combination, a flat topped cylinder block having a cylinder formed therein and adjacent inlet and outlet ports formed therein at one side only of said cylinder and opening onto said flat top, a valve for each of said ports seating against said flat top for controlling the flow of gases through said ports, a cylinder head overlying said flat top, a piston reciprocable in said cylinder, a symmetrical substantially spherical domed head on said piston, and a combustion chamber formed in said cylinder head and overlying said cylinder and valves, that portion of said combustion chamber on the opposite side of the cylinder axis from said valves being shaped complementary to the corresponding half of said domed head the construction being such that a part of the dome substantially fills the last named portion of the combustion chamber having mechanical clearance only therebetween when said piston is at the outer end of said stroke, the height of said combustion chamber, measured in a direction parallel to the axis of said cylinder, being a minimum over said valves and being a maximum between said valves and the axis of said cylinder with the piston on dead center, said combustion chamber being so constructed and arranged that its cross-sectional area measured in a plane approximately parallel with both the axis of said cylinder and the centers of said valves are substantially the same at any point between the centers of said valves and the adjacent side of said cylinder, and an ignition point serving said combustion chamber located at the valve end thereof.

ALANSON P. BRUSH.